Oct. 17, 1967  M. E. PHILLIPS, JR., ETAL  3,347,180
ALIGNER FOR BREAD ROLLS
Filed Oct. 12, 1964  3 Sheets-Sheet 1
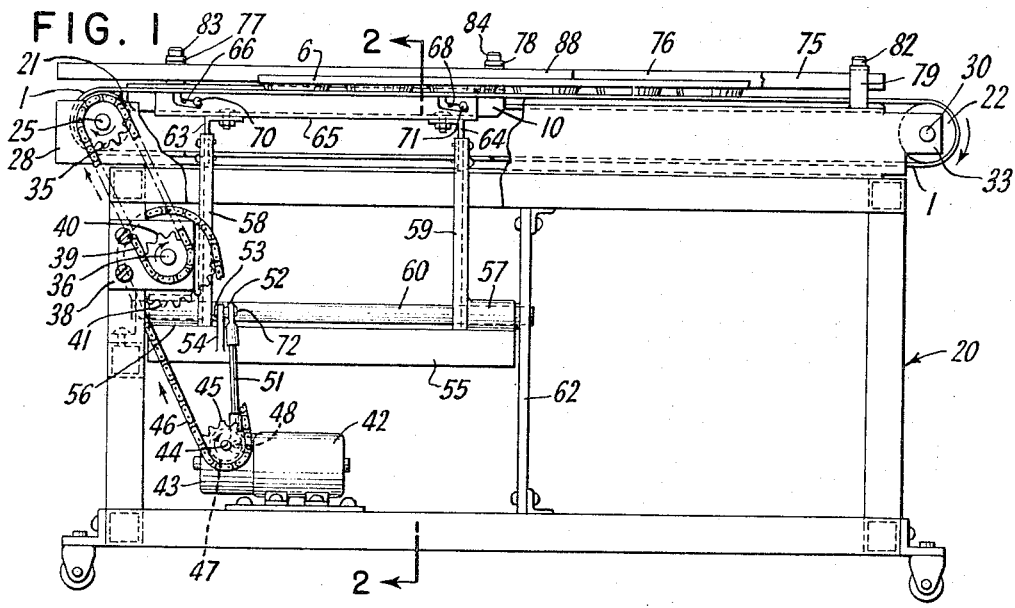
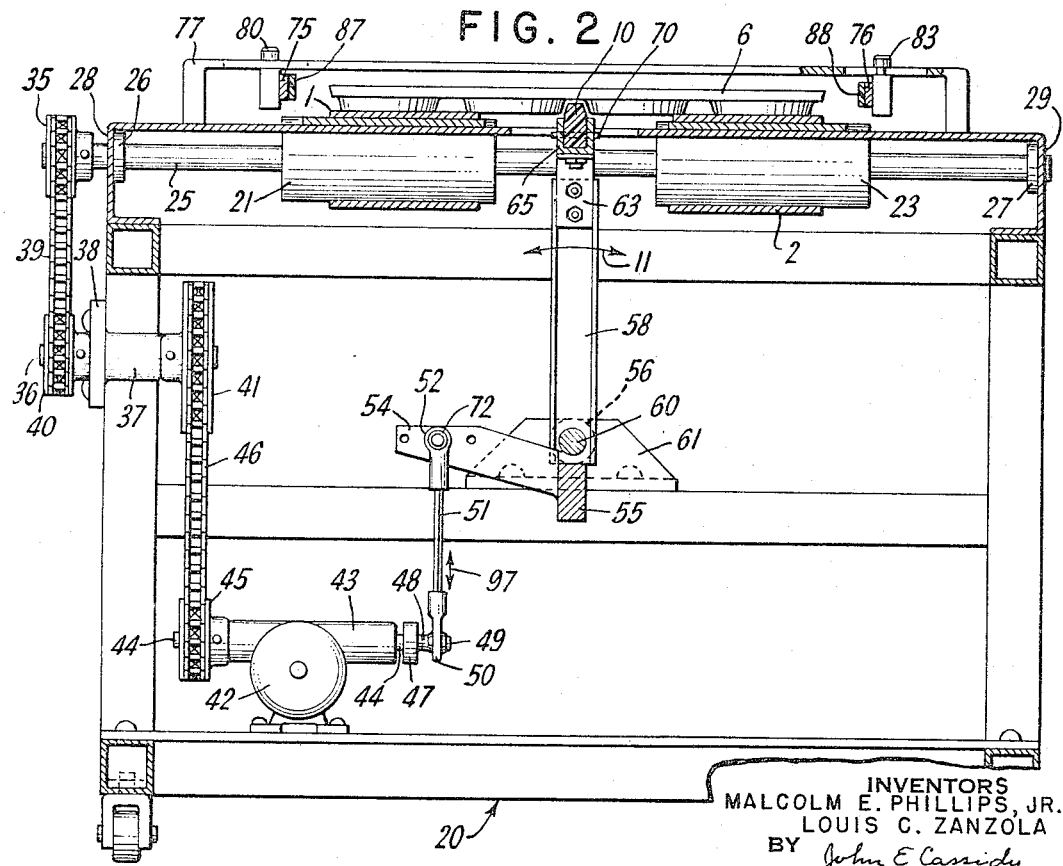
INVENTORS
MALCOLM E. PHILLIPS, JR.
LOUIS C. ZANZOLA
BY John E Cassidy
ATTORNEY INVENTORS
MALCOLM E. PHILLIPS, JR.
LOUIS C. ZANZOLA
BY John E Cassidy
ATTORNEY Oct. 17, 1967   M. E. PHILLIPS, JR., ETAL   3,347,180
ALIGNER FOR BREAD ROLLS
Filed Oct. 12, 1964   3 Sheets-Sheet 3
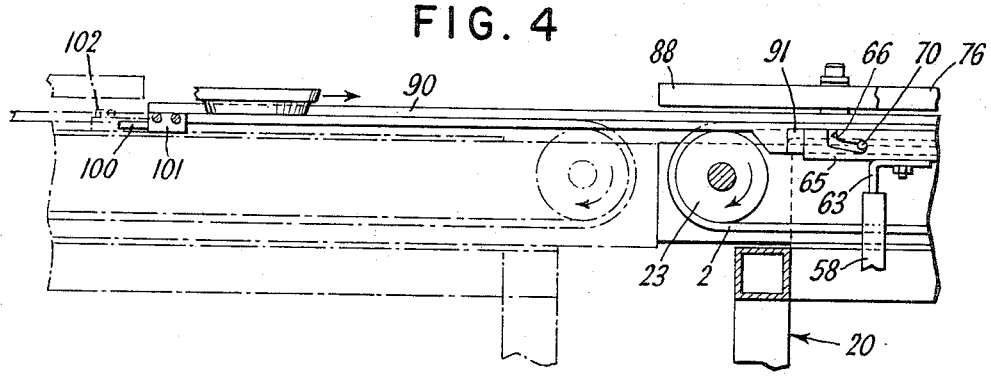
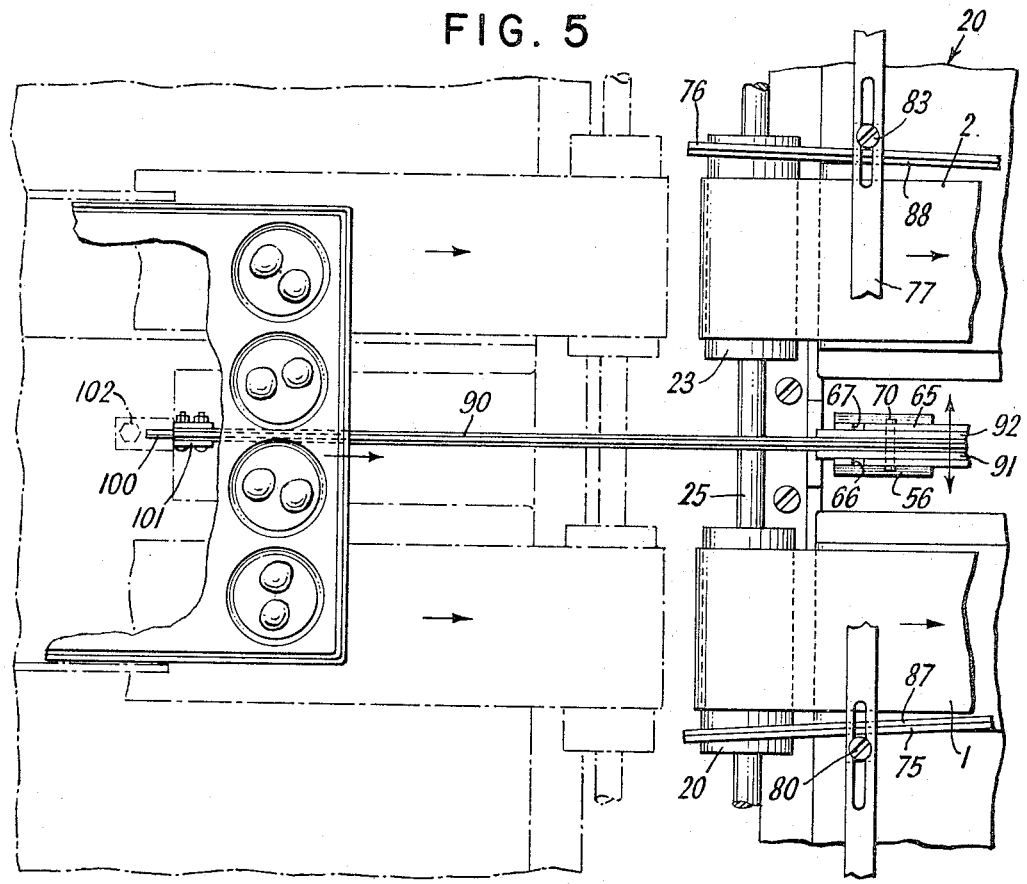
INVENTORS
MALCOLM E. PHILLIPS, JR.
LOUIS C. ZANZOLA
BY *John E Cassidy*
ATTORNEY

3,347,180
ALIGNER FOR BREAD ROLLS
Malcolm E. Phillips, Jr., and Louis C. Zanzola, Richmond, Va., assignors to American Machine & Foundry Company, a corporation of New Jersey
Filed Oct. 12, 1964, Ser. No. 403,238
7 Claims. (Cl. 107—54)

This invention relates, in general, to automatic bakery machinery. In particular, the invention relates to bakery machinery employed in the production of twin rolls which are attached to each other and which are separable at a cleavage line defined by their interface. In greater particularity, the invention relates to conveyor machinery for the compartmented baking pans for twin or attached pairs of rolls. In even greater particularity, the invention relates to an arrangement for effecting a preferred orientation of randomly disposed attached paired rolls in their respective baking pan compartments.

Certain bakery products are of the type where the dough is separated, cut in suitably sized pieces which may be partially or wholly baked, and are packaged at the bakery; and the consumer, in the case of the partially baked product, merely has to reheat (or brown) such products to ready them to serve; whereas, of course, the wholly baked product is ready for immediate serving. Among such packaged products are twin bread rolls which are attached to each other to form pairs. When packaging such twin rolls, if the rolls are so oriented that their respective lines of cleavage are parallel to each other, a more attractive package will result. In the production of bread rolls of the twin or attached pair type, two pieces of dough are randomly placed by a dough dispensing device in each of the several cups or compartments of a baking pan as it is moved along a conveyor. The pieces of dough, at the point of contact are proofed together, forming a line of cleavage at which the two rolls of a pair may be separated. The lines of cleavage of the rolls so formed are randomly oriented. Such random orientation offers no disadvantage when the rolls are to be manually packaged. However, the random orientation of the rolls detract from the appearance of the package when automatic packaging is employed. Applicant has discovered that the attached paired rolls may be given a preferred orientation, such that their respective lines of cleavage are aligned parallel to each other and at right angles to the direction in which the pans in which they are contained are moving along a conveyor. The desired orientation and alignment is effected by agitating the baking pans in a substantially horizontal plane and in a direction substantially transverse to the movement of the pans along the conveyor. As the pans approach the conveyor, each cup or compartment will have had two randomly disposed pieces of dough placed therein by a preceding machine (not shown). As the filled pans travel along the conveyor, the above-described agitation of the pans causes the two randomly disposed pieces of dough in each of the cups to be nested together at the bottom of the cup, abutting each other, and oriented so that their interfaces are in alignment and are at right angles to the motion of the conveyor travel.

An object of the invention is to expedite the automatic packaging of randomly disposed twin or paired, attached rolls being moved in baking pans along a bakery conveyor.

Another object of the invention is to effect an orientation and alignment of the interface planes of a plurality of attached paired rolls in baking pans moving along a bakery conveyor, so that their interface planes are parallel to each other and at right angles to the direction of motion of the pans on the conveyor.

Still another object of the invention is to improve the uniformity in shape and appearance of finished bakery products.

Still another object of the invention is to provide an orienting and aligning device for randomly disposed twin or attached paired rolls contained in baking pans moving along a conveyor, and which orienting and aligning device may be readily adapted to function with various types of baking pans.

A feature of the invention is a vibratile agitating blade or rod, disposed longitudinally of a conveyor for compartmented twin-roll baking pans for engaging with the baking pans and for imparting thereto a lateral oscillatory motion to cause the agitation of the two randomly disposed pieces of dough in each compartment, thereby effecting the abutment and the preferred orientation and concomitant alignment of the two pieces of dough.

Another feature of the invention is an agitation blade or rod, which has a cross-sectional contour and is dimensioned to correspond to the contour and dimensions of the channel or trough on the underside of and between adjacent rows of cups or compartments of the particular type of baking pan being used therewith.

Still another feature of the invention is the provision of an alternative agitating blade structure having a narrower and elongate flexible extension at one end thereof, the other end of the extension being fixedly supported to prevent its vibration, and to permit the unimpeded movement therealong of baking pans having a narrow channel or trough between adjacent rows of cups or compartments.

The above, and other objects and features of the invention will be evident from the attached drawings in which:

FIG. 1 is a side elevation of a machine embodying an aligner for twin bread rolls;

FIG. 2 is an enlarged elevation of the same, partially in section, as viewed on line 2—2 of FIG. 1;

FIG. 4 is a side elevation of a portion of the machine embodying an alternative form of blade construction; and FIG. 5 is a plan view of the same.

General description

Figure 3:
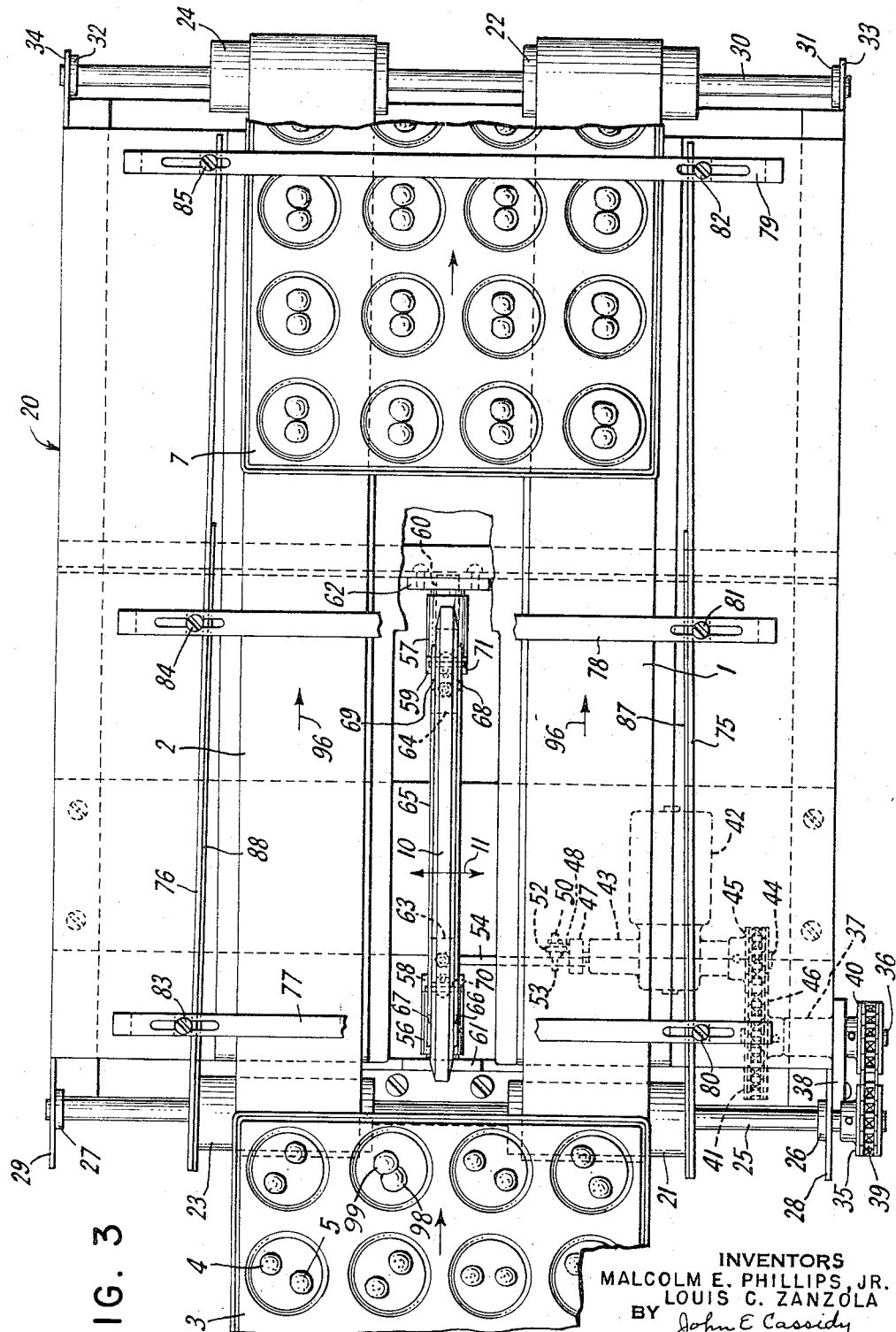
FIG. 3 is an enlarged plan view of the same with a portion broken away to more clearly show the blade support.

To facilitate an understanding of the invention, and having in mind the above objects and features, the invention will be first described in very general terms.

FIGS. 1–3 of the drawings discloses an exemplary embodiment of applicants' invention. Referring to FIG. 1, the conveyor structure is designed to be positioned with its left hand, or input, end adjacent to and in alignment with a device (not shown) well known in the art, for depositing two pieces of dough in each of the several cups or compartments of a series of compartmented roll-baking pans rightwardly carried by a conveyor mechanism cooperating therewith. The right-hand end of the conveyor structure is designed to be positioned adjacent to and in alignment with a pan-conveyor extension (not shown) well known in the art, for conveying the baking pans through the next succeeding production stage.

FIGS. 1–3 show a conveyor comprising belts 1 and 2 upon which the baking pans such as 3, for example, are carried in a left to right direction. Situated between the conveyor belts 1 and 2 and parallel to their length, is an agitator blade 10 supported and driven in such a manner as to oscillate laterally as indicated by the arrows 11. Pan (e.g.) 3 will have had two pieces of dough (e.g.) 4 and 5 placed in each of its cups or compartments. As the conveyor carries the pans from left to right, the trough or channel in the underside of the pan, defined by the space between the two innermost and adjacent rows of cups, will be aligned with blade 10. As one of the pans such as 6, for example, continues its rightward motion, its center trough or channel will have moved into engagement with blade 10. The lateral oscillations of blade 10 will impart a vibratile motion to pan 6, causing the randomly disposed pieces of dough (e.g.) 4 and 5 in the several cups or compartments to be nested together at the bottom of the cups, abutting each other, and oriented so that the planes of the abutment interface are in alignment and are at right angles to the direction of conveyor travel, as shown in pan 7 at the right-hand side of FIG. 3. The conveyor continues to carry the pans toward the right for the next stage in the production process.

The utility of the exemplary structure shown in FIGS. 1–3 is enhanced by the ease with which, by merely changing agitator blades, it may be adapted for use with baking equipment using pans having a narrow channel or groove between the underside of adjacent rows of cups. An exemplary disclosure of such an alternative construction of an agitator blade is illustrated in FIGS. 4 and 5. In FIGS. 4 and 5 the agitator blade structure is provided with an elongated flexible extension 90 protruding into the preceding machine on its left (partially shown in FIGS. 4 and 5) where it is fixedly supported to prevent its vibration, and to facilitate the alignment of the narrow channels or grooves in the underside of the pans with the narrow end of the blade. In this construction, it will be noted that the right-hand or heavier portion of blade 10 is free to oscillate laterally as before, communicating its lateral motion to the extension. However, since the other end of the blade extension is fixedly supported, the amplitude of the vibration of the extended portion of the blade will vary, from zero at its fixed end to an amplitude equal to that of the heavier portion of the blade at its point of attachment thereto.

*Detailed description*

Applicants' aligner for bread rolls incorporates means for imparting two components of motion to the pans used in baking twin or attached paired rolls. An exemplary embodiment of the invention as shown in FIGS. 1–3 comprises a frame or table structure 20 supporting the several parts of the machine. At the upper part of the machine are two horizontally disposed conveyor belts 1 and 2. Belt 1 is carried by drums 21 and 22; and belt 2 is carried by drums 23 and 24. Drums 21 and 23 are secured to the conveyor drive shaft 25 carried by bearings 26 and 27 supported by frame members 28 and 29, respectively. Drums 22 and 24 are secured to shaft 30 carried by bearings 31 and 32 supported by frame members 33 and 34, respectively. Secured to the end of shaft 25 is a sprocket 35. An intermediate shaft 36 is carried by bearing 37 supported by frame member 38. Secured to one end of shaft 36 is a sprocket 40; and secured to the other end of shaft 36 is a larger diameter sprocket 41. Sprockets 35 and 40 are linked together by a drive chain 39. Mounted at the bottom of the frame structure is motor 42 which, in turn, supports a speed reduction train enclosed in housing 43. Extending from housing 43 is a shaft 44. Secured to one end of shaft 44 is a sprocket 45. Sprockets 41 and 45 are linked together by a drive chain 46. Secured to the other end of shaft 44 is a disc 47 into which is affixed the eccentric pin 48 having a ball 49 at the end thereof. Ball 49 is pivotally connected to a ball and socket joint 50 at the lower end of the connecting rod 51. At the upper end of connecting rod 51 is another ball and socket joint 52 which is pivotally connected to a ball 72 at the end of pin 53 affixed to the end of the agitator rocker arm 54. Rocker arm 54 is integral with bar 55, bearings 56 and 57 at the ends thereof, and with the blade-supporting arms 58 and 59. Bearings 56 and 57 are movably supported by shaft 60 which, in turn, is supported at its two ends by structural members 61 and 62. Affixed to the upper ends of blade-supporting arms 58 and 59 are brackets 63 and 64, respectively, to which is secured the U-shaped blade-supporting member 65. The blade-supporting member 65 is provided with L-shaped slots 66, 67, 68 and 69. Fitting snugly into the U-shaped blade-supporting member 65 is the agitator blade 10. Blade 10 is held securely in place in member 65 by the pins 70 and 71 which pass transversely through blade 10. Pin 70 engages with slots 66 and 67; and pin 71 engages with slots 68 and 69.

The conveyor belts 1 and 2 are adapted to support and to propel therealong the baking pans 3, 6 and 7, as examples, received from the last preceding machine. Adjustably supported guide rails 75 and 76 are provided to limit the lateral movement of the baking pans. The position of guide rail 75 is adjustable in the slotted transverse supports 77, 78 and 79 by means of set screws 80, 81 and 82. Similarly, the position of guide rails 76 is adjustable by means of set screws 83, 84 and 85.

The baking pans commonly in use vary quite widely as to the spacing between, and the shape of, adjacent rows of cups or receptacles; and it follows that the contour of the groove or channel on the underside of the pans forming the separation between adjacent rows of cups will vary with the size, shape, and spacing of the cups. It is desirable that the cross-sectional contour and dimensions of blade 10 should be in conformity with the contour of the groove or channel in the underside of the pans in order to minimize wear and tear on the pans, and that the pans may slide smoothly therealong. The blade 10, as shown in FIGS. 1–3, is an exemplary showing of a blade having a relatively thick cross-section, and adapted for use with pans having rather widely spaced cups. The L-shaped slots 66, 67, 68 and 69 in blade-supporting member 65 permit the easy removal of one blade and the substitution of another, without having to unfasten any bolts, nuts, screws or studs, etc.

When a particular baking operation requires that a different or alternative type of baking pan be used, wherein the size, shape and space of the cups or compartments is different than that exemplarily shown in FIGS. 1–3, the agitating blade used with such pans must be of suitable size and shape to fit the channel or groove in the underside of the baking pans. This, of course, necessitates the removal of the blade 10 and the substitution of a blade of alternative construction, suitable dimensions and contour, and otherwise adapted for use with the alternative pans.

*Alternative construction of blade*

Referring now to FIGS. 4 and 5, the exemplary alternative agitating blade structure shown therein comprises the elongated flexible member 90 and the two shorter members 91 and 92; all of which members are snugly fitted within the blade-supporting member 65, and are held securely in place in member 65 by the pins 70 and 71 (FIGS. 1 and 2). The left hand end of blade member 90 has a pin or dowel 100 secured thereto by clamp 101. The blade member 90 extends leftwardly into the preceding machine (partially shown in FIGS. 4 and 5) and the dowel 100 is fixedly attached thereto by means of clamping screw or stud 102.

*The conveyor*

The operation of the conveyor portion of the aligner is as follows: The operation of motor 42, through the speed reduction train enclosed by housing 43, causes shaft 44 to rotate. Shaft 44 (as viewed in FIG. 1) causes sprocket 45 secured thereto to rotate in a clockwise direction. Sprocket 45, through chain 46, drives sprocket 41 and intermediate shaft 36 in a clockwise direction. The clockwise rotation of intermediate shaft 36 drives sprocket 40 secured thereto in a clockwise direction. Sprocket 40, through chain 39, drives sprocket 35 and the conveyor drive shaft 25 in a clockwise direction. The clockwise rotation of conveyor drive shaft 25 drives the conveyor drums 21 and 23 in a clockwise direction. The clockwise motion of drums 21 and 23 causes conveyor belts 1 and 2, respectively driven thereby and supported by idler drums 22 and 24, respectively, to travel from left to right. Baking pans (e.g.) 3 fed in from a preceding machine (not shown) onto the belts 1 and 2 will traverse the top of the aligner conveyor as indicated by the arrows 96 (FIG. 3); and the pans will be ready to exit from the aligner conveyor, as illustrated by pan 7, for example.

The agitator

The operation of the agitator portion of the aligner is as follows: The operation of motor 42, through the speed reduction train enclosed by housing 43, causes the rotation of shaft 44 and disc 47 secured thereto (FIG. 2). The eccentric pin 48, affixed to disc 47, communicates a reciprocating motion through the ball 49 at the end thereof and through the ball and socket joint 50, to the connecting rod 51, as indicated by the arrows 97 (FIG. 2). The connecting rod 51, through the ball and socket joint 52 at its upper end, and through the ball 72 at the end of pin 53, communicates its reciprocating motion to rocker arm 54. The reciprocating motion imparted to rocker arms 54 causes it to rock on its bearings 56 and 57 supported on shaft 60, causing its vertical members 58 and 59, integral with the rocker arm 54, to rock laterally about shaft 60. The lateral rocking motion of members 58 and 59 causes the U-shaped blade-supporting member 65 and the agitator blade 10 mounted therein to oscillate laterally, as indicated by the arrows 11. The blade 10, it will be remembered, is dimensioned and contoured to fit slidably within the groove or trough in the underside of the baking pans defined by the space between the two central rows of cups or compartments and the shape of the cups.

In a preceding machine, partially shown in FIGURES 4 and 5, a dough dispensing device will have randomly disposed two pieces of dough (e.g.) 4 and 5 in each of the several cups or compartments of a baking pan such as 3, for example (FIG. 3). As the pan (e.g.) 3 enters the aligner, it is carried in a left to right direction by conveyor belts 1 and 2, causing the groove in the underside of the pan to straddle the agitator blade 10 (FIG. 2). The lateral oscillations of blade 10 will be imparted to the baking pan (e.g.) 6 (FIG. 2) in contact therewith, causing a lateral vibratory or shaking motion to be imparted to the two pieces of dough in each of the several cups or compartments of the pans. The aligner is fitted with adjustably positionable guide rails 75 and 76 which, it will be observed (FIG. 3), are not precisely parallel to the line of travel of the conveyor but are further apart at the left hand side of the aligner belts 1 and 2. This is to afford the baking pans a greater amplitude of lateral motion while they are in contact with and are being laterally shaken or vibrated by the agitator blade 10. The lateral shaking or vibratory motion imparted to the baking pans by the agitating blade 10 causes the two pieces of dough in each of the several cups or compartments of the pans to be so oriented that the axes respectively joining the centers of the two pieces of any cup will be parallel to each other and will be at right angles to the direction in which the pan is oscillated. The lateral agitation of the pans also ensures that when one of the two halves or pieces of dough is inadvertently deposited on the top of the other piece of dough in one or more of the cups (e.g.) 98 and 99, the two pieces of dough will be nested beside and in contact with each other in the bottoms of their respective cups, thus improving the uniformity of the appearance of the finished product. As the baking pans continue their progress through the aligner, each pan, such as 7, for example, will, in its turn, be carried along the agitator blade 10 to the right hand side of the aligner, where it may be transferred to the next succeeding machine such, for example, as a pan conveyor extension (not shown) well known in the art, for conveying the pans to the next succeeding production stage. It will be observed that in the pan 7 (FIG. 3) the two pieces of dough are in physical contact with each other, and their respective lines of cleavage are aligned parallel to each other, and parallel to the lateral oscillatory motion of the pans.

FIGS. 1–3 illustrate an exemplary embodiment of an aligner which is adapted for the production of rolls known as Brown 'n' Serve. In this particular embodiment, the agitating blade 10 is shaken or vibrated laterally at a frequency of approximately 150 cycles per minute; and which frequency produced very satisfactory results. However, the vibration frequency of blade 10 is not critical and good results may be had at frequencies either above or below 150 cycles per minute.

When a different or alternative type of baking pan is used for, for example, relatively closely spaced cups or compartments, the blade 10 is removed, and a suitable dimensioned and contoured blade, as shown in FIGS. 4 and 5 is substituted therefor. As previously described, the left hand end of blade member 90 is securely anchored in the preceding machine, which is fragmentarily shown in FIGURES 4 and 5. The right hand end of blade member 90 is supported between members 91 and 92, and is laterally vibrated by the lateral oscillatory motion of the blade-support member 65. Since the elongated blade member 90 is flexible, the right hand is free to vibrate laterally at substantially the same amplitude as its point of attachment to the blade supporting member 65; but the left hand end of blade member 90, being rigidly anchored in the preceding machine, has zero amplitude of vibration and, of course, at points intermediate its left hand end and where it meets members 91 and 92, the amplitude of vibration will vary from zero to a maximum (i.e., that of the blade-supporting member 65). With pans having closely spaced cups, and hence a narrow underside groove or channel therebetween the absence of motion at the left hand end of blade member 90 permits the pan groove or channel to register therewith, and permits the pan to freely move to the right along the blade structure, progressing through the portion of the blade structure where it is vibrating at its maximum, and thence progressing to the point where it leaves the aligner and enters the next succeeding machine.

In the production of twin rolls, it has been the practice, after the two pieces of dough have been deposited in each of the compartments of a baking pan, to spray the pan and contents with a suitable oil to prevent the two halves of the twin roll from becoming inseparably fused together during proofing and baking. When the applicants' aligner is to be employed to align the two pieces of dough in each of the several compartments of a baking pan, the oil spray operation should be deferred until the pieces of dough have been brought into alignment. Otherwise, the sprayed oil would tend to adhere the dough pieces to the pan—thus hindering the effective operation of the aligner.

After the agitation, alignment, and orientation of the pieces of dough shall have been consummated, and during the latter part of the time that the pans are traveling along the conveyor portion of the aligner or at some point subsequent thereto prior to proofing and baking, the pans and the pieces of dough therein may be sprayed with oil to prevent the two halves of the rolls from inseparably fusing together. The oil spraying device may be of a conventional design, well known in the art, such, for example, as the unit made by the Clayton Specialties Inc., 642 Cantwell Drive, Corpus Christi, Tex.

Referring to FIGS. 2 and 3, if desired, the guide rails 75 and 76 may be coated on a portion of or on all of the length of their inner vertical surfaces with a layer of a suitable plastic or resilient material such as Teflon, for example, as indicated by reference numerals 87 and 88, respectively. Such coating, particularly at that portion of the guide rails which is "bumped" by the pans as they are being agitated, augments the effectiveness of the dough aligning phase.

Also, if desired, the guide rails 75 and 76 may be resolved into two separate sections or pairs of guide rails. The rails of the first section may be splayed at their left ends, to facilitate the entry of pans. Since the guide rails of the first section are used to limit the amplitude of the agitative motion of the pans, these rails may be Teflon coated to minimize mechanical shock to the pans. The rails of the second section also may be splayed to facilitate the entry of the pans from the first section of the guide rails, but need not be Teflon coated.

What is claimed is:

1. In combination in an article aligner:
 a conveyor for moving therealong a receptacle containing a plurality of randomly disposed articles,
 driving means for said conveyor, and
 vibratory means for axially aligning said articles within said receptacle at right angles to the direction of said vibration, said vibratory means including:
  means operable to engage said receptacle,
  means operable to impart vibratory movement to said means engaging said receptacle to vibrate the receptacle and the articles contained therein, and
  driving means for said means operable to impart vibratory movement to the means engaging the receptacle.

2. In combination in an article aligner:
 a conveyor for moving therealong a multi-receptacle container having in each of said receptacles a pair of randomly disposed articles,
 driving means for said conveyor, and
 means for aligning each of said pairs of articles along respective axes parallel to the direction of movement of the conveyor, said aligning means including:
  means operable to engage said receptacle,
  means operable to impart vibratory movement to said means engaging said receptacle to vibrate the receptacle and the articles contained therein, and
  driving means for said means operable to impart vibrating movement to the means engaging the receptacle.

3. In a bakery machine, an aligner for twin rolls comprising:
 a conveyor for moving rectilinearly therealong multi-compartment baking pans having longitudinal grooves on the undersides thereof and a pair of randomly disposed pieces of dough in each of said compartments,
 driving means for said conveyor, and
 means for aligning each of said pairs of pieces of dough along axes parallel to the direction of movement of the conveyor, said aligning means including:
  a blade support extending longitudinally of said conveyor,
  an agitating blade detachably mounted in said blade support and contoured to slideably engage said groove in said pans,
  means connected to said blade support for vibrating said agitating blade, said pans and said pieces of dough, and
  driving means for said vibrating means; and
 a pair of guide rails disposed longitudinally of said conveyor for guiding said pans as they move along said conveyor and said agitating blade, said guide rails being operable to limit the amplitude of the vibration of said pans.

4. In the invention according to claim 3, wherein said agitating blade is an elongated interchangeable bar having a prescribed cross-sectional contour, depth, width, and length to adapt said bar to slideably engage with said groove in said pans, said bar being provided with means to permit its ready attachment to or removal from the aligner, whereby blade interchangeability is achieved.

5. In the invention according to claim 3, wherein said agitating blade is a substantially non-flexible elongated interchangeable bar having a length substantially co-extensive with the length of said blade support and having a prescribed cross-sectional contour, depth, and width to adapt said bar to slideably engage with said groove in said pans where said pans are provided with a wide groove, said bar being provided with transverse pins to cooperate with said blade support to permit its ready attachment to and removal from said blade support, whereby blade interchangeability is achieved.

6. In the invention according to claim 3, wherein said agitating blade is an elongated interchangeable bar, the length of which comprises two contiguous portions, the first portion of said length comprising a substantially non-flexible section substantially co-extensive with the length of said blade support and having a prescribed cross-sectional contour, depth, and width to adapt said bar to slideably engage with said groove in said pans where said pans are provided with a narrow groove, said first portion of said bar being provided with transverse pins to cooperate with said slotted blade support to permit its ready attachment to and removal from said blade support, whereby said blade interchangeability is achieved, and contiguous with and extending from said first portion the second and remaining portion of the length of said blade comprising an attenuated flexible section, and anchoring means at the remote end of said flexible second portion for preventing the movement thereof, whereby said first portion of said blade vibrates at the amplitude of vibration of said blade support, and the vibration amplitude of the said second portion of said blade decreases from a maximum at its point of attachement to said first portion to zero at the said remote anchored end, to thereby permit said pan having said narrow groove to easily register with sand anchored remote end of said attenuated portion.

7. The method of aligning, orienting, and co-planarly positioning a plurality of pairs of randomly disposed pieces of dough contained in the respective compartments of multi-compartmented baking pans used in baking twin rolls, comprising the steps of: moving said pans containing said pieces of dough a rectilinear path, and laterally agitating said pans and said pieces of dough in a direction transverse to said rectilinear path to thereby align and orient each of said pairs of pieces of dough within each of said compartments on axes that are oriented parallel to each other and at right angles to the direction of said agitation, said lateral agitation also co-planarly positioning inadvertently superimposed pairs of pieces of dough so that they are beside each other in their respective compartment.

References Cited

UNITED STATES PATENTS

| 1,419,808 | 6/1922 | Bosshard | 107—7.7 |
| 3,232,243 | 2/1966 | DeFlorez et al. | 107—1.7 |
| 3,255,864 | 6/1966 | Oldershaw et al. | 198—33 |

WALTER A. SCHEEL, *Primary Examiner.*

J. SHEA, *Assistant Examiner.*